J. H. SCHLENTER.
THRESHING MACHINE FEEDER.
APPLICATION FILED JULY 15, 1908.
922,520.
Patented May 25, 1909.
2 SHEETS—SHEET 1.
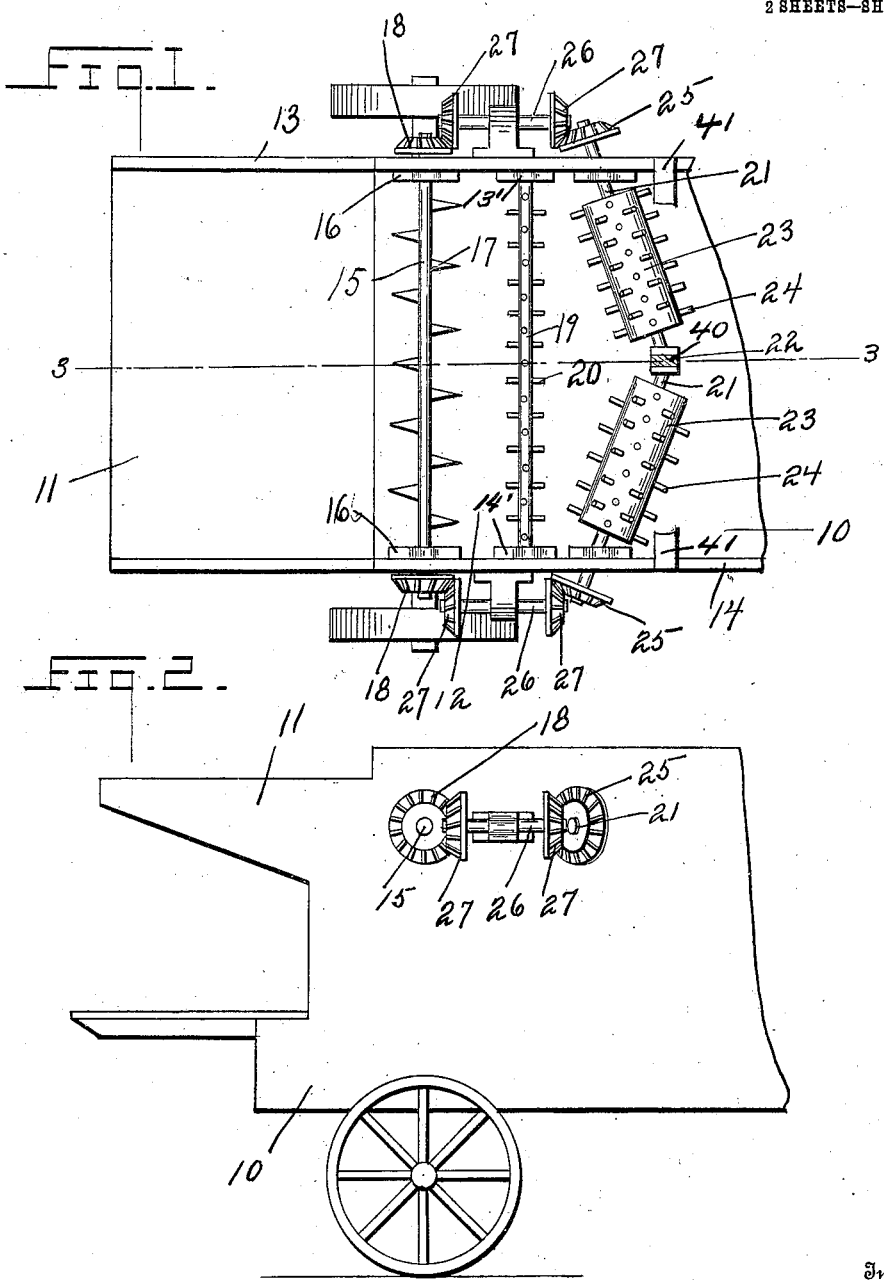
Inventor
John H. Schlenter.
Witnesses
C. E. Johansen
E. L. Chandlee
By Woodward & Chandlee
Attorney J. H. SCHLENTER.
THRESHING MACHINE FEEDER.
APPLICATION FILED JULY 15, 1908.
922,520.
Patented May 25, 1909.
2 SHEETS—SHEET 2.
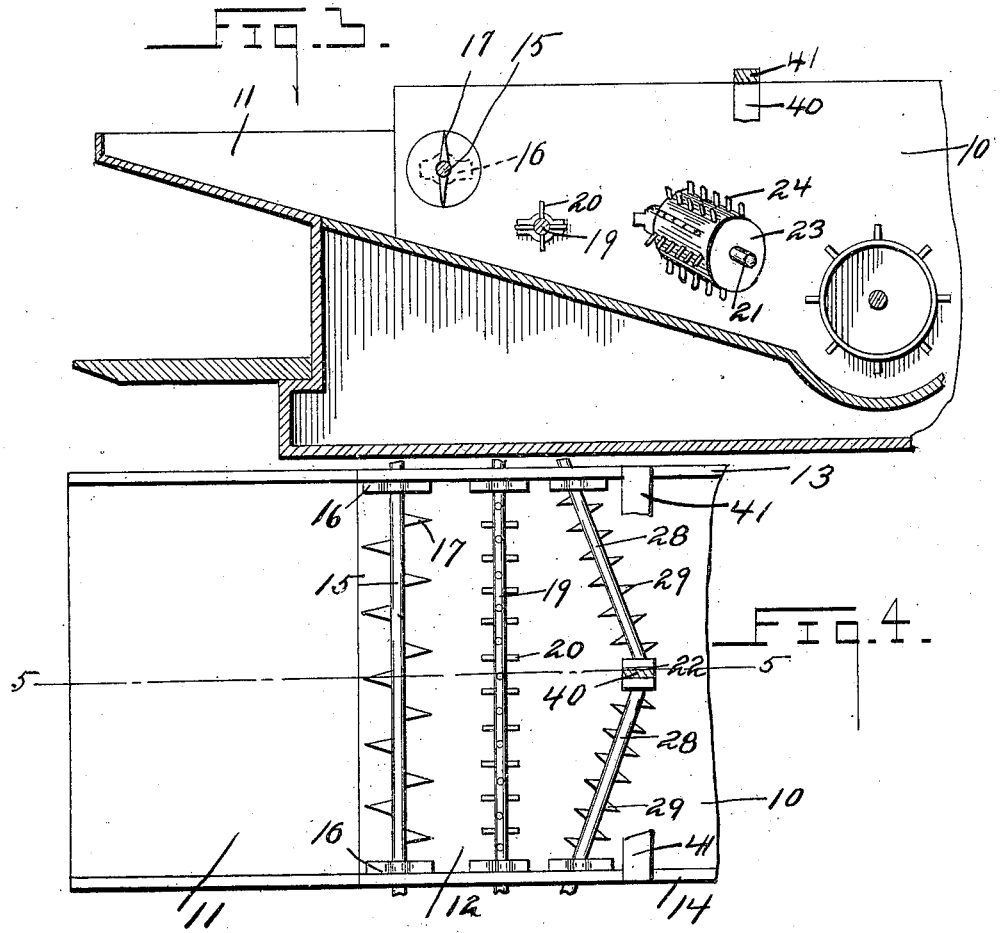
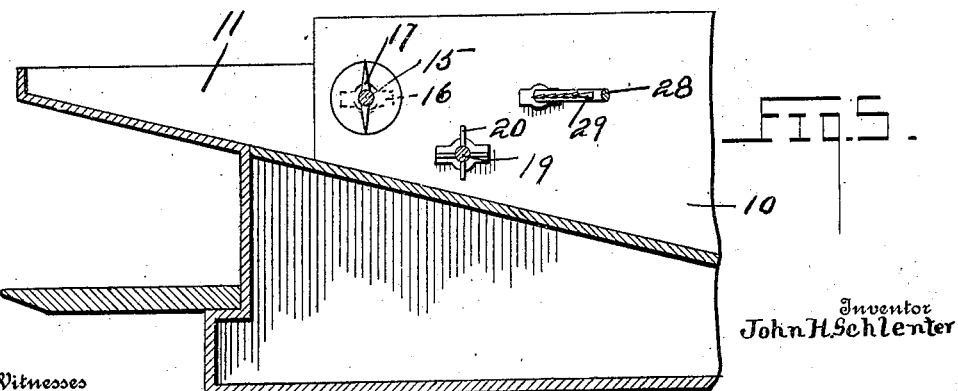
Witnesses
E. E. Johansen
E. L. Chandlee
Inventor
John H. Schlenter
By Woodward & Chandlee
Attorney
THE NORRIS PETERS CO., WASHINGTON, D. C.

UNITED STATES PATENT OFFICE.

JOHN H. SCHLENTER, OF CASCADE, WISCONSIN.

THRESHING-MACHINE FEEDER.

No. 922,520.              Specification of Letters Patent.         Patented May 25, 1909.

Application filed July 15, 1908. Serial No. 443,664.

*To all whom it may concern:*

Be it known that I, JOHN H. SCHLENTER, a citizen of the United States, residing at Cascade, in the county of Sheboygan and State of Wisconsin, have invented certain new and useful Improvements in Threshing-Machine Feeders, of which the following is a specification.

This invention relates to threshing machines, and more particularly to spreaders therefor, and has for its object to provide a device of this character whereby material particularly in bundle form may be fed to a threshing machine and effectively spread adjacent to its point of entrance whereby it may be conveniently distributed at all points of a shaking table or the like.

Other objects and advantages will be apparent from the following description and it will be understood that changes in the specific structure shown and described may be made within the scope of the claim and that any suitable materials may be used without departing from the spirit of the invention.

In the drawings forming a portion of this specification, and in which like numerals of reference indicate similar parts in the several views, Figure 1 is a top plan view of a portion of a threshing machine showing the application of the present invention thereto, Fig. 2 is a side elevational view, Fig. 3 is a longitudinal sectional view on the line 3—3 of Fig. 1, Fig. 4 is a top plan view of a modified form of my invention, Fig. 5 is a transverse sectional view on the line 5—5 of Fig. 4.

Referring now more particularly to the drawings, there is shown a threshing machine 10 provided with a feed table 11. Disposed upon the feed table adjacent to the inner end thereof, there is shown a feeding attachment 12 consisting of parallel spaced members 13 and 14 respectively. A shaft 15 is journaled adjacent to its ends in bearings 16 carried by the members 13 and 14 at their outer ends, and this shaft is provided with a plurality of cutting knives 17. The shaft 15 at each end is provided with a bevel gear 18, for a purpose to be hereinafter described.

Disposed inwardly of the shaft knife 15 and at a point adjacent to the table 11 there is shown a shaft 19 which is journaled at its ends in the bearings 13' and 14', and this shaft is provided with a plurality of radial teeth 20. The shaft 19 will hereinafter be termed a retarding shaft. Diagonally disposed are the cylinder shafts 21 located inwardly of the shaft 15 and are disposed with portions above the retarding shaft 19, as shown. The shafts 21 are journaled at their outer ends in the members 13 and 14, and at the inner ends these shafts are journaled in a bearing 22. Each shaft is provided with a cylinder 23 which carries a plurality of radial fingers or pins 24. The outer end of each shaft 21 is provided with a bevel gear 25. Longitudinally disposed shafts 26 are journaled in brackets carried by the members 13 and 14, and these shafts are provided at their ends with bevel gears 27 in mesh with the gears 25 and 18 of their adjacent cylinders, as shown. It will thus be seen that bundles of material to be threshed may be fed in the ordinary manner from the feed table 11, and it is obvious that the bundle will be discharged from below the band shaft 15 to the loosely journaled retarding shaft 19 which is disposed with portions beneath portions of the cylinders 23. The material passes both over and below the retarder. The bearing 22 is held by a depending bracket 40 secured to a revolubly held bar 41 crossing from one side of the thresher frame to the other. The retarders 20 slacken the feed of the material so that it may be effectively spread by the two cylinders 23. The shaft 15 may receive power from a suitable working part of the threshing machine or other suitable source.

In the modified form of my invention shown in Figs. 4 and 5 I omit the cylinders 23 and provide diagonally disposed shafts 28 which carry a plurality of cutting knives 29 which are similar in construction to the cutting knives 17 carried by the shaft 15 as described in the preferred form of my invention.

What is claimed is:

In a device of the character described, the combination with a shaft, of a plurality of band cutting knives secured to said shaft, a revolubly held retarding shaft positioned in advance of and below said knife shaft, a plurality of teeth secured to said retarding shaft, two obliquely held shafts secured to a centrally positioned bearing, spreading cylinders upon said last mentioned shaft, and gears connecting said knife and cylinder shafts to rotate said shaft in opposite directions.

In testimony whereof I affix my signature in presence of two witnesses.

JOHN H. SCHLENTER.

Witnesses:
ALBERT RADTKE,
THOS. MCBRIDE.